United States Patent [19]

Bernaerts

[11] 3,939,857

[45] Feb. 24, 1976

[54] DUAL PIEZOELECTRIC FLUID JET TRANSFER VALVE

[76] Inventor: Henry J. Bernaerts, R.F.D. 10, Box 1610, Annapolis, Md. 21401

[22] Filed: June 24, 1975

[21] Appl. No.: 589,739

[52] U.S. Cl. .......... 137/83
[51] Int. Cl.$^2$ .......... G05D 16/20; F15B 5/00
[58] Field of Search .......... 137/83, 625.64; 91/3

[56] References Cited

UNITED STATES PATENTS

| | | | |
|---|---|---|---|
| 3,286,719 | 11/1966 | Myers | 137/83 |
| 3,550,609 | 12/1970 | Roche | 137/83 |

*Primary Examiner*—Alan Cohan
*Attorney, Agent, or Firm*—R. S. Sciascia; Q. E. Hodges; D. McGiehan

[57] ABSTRACT

A dual piezoelectric fluid jet transfer valve having two opposing piezoelectric tubes that can carry fluid. One end of each tube is clamped to provide cantilever action. The free ends of the tubes are in alignment when they are unenergized or when both are energized to the same magnitude and polarity. Then flow occurs across the gap at the free ends. The free ends of the tubes will be out of alignment when one tube is energized and the other not, or when both are energized to different magnitudes and/or polarity. Then flow will be discontinued across the gap at the free ends. By using two opposing and separate tubes, it is possible to use a single or dependent sources of energization. Easier opening therefore will result, since less deflection is required of each tube to attain misalignment. Further, two independent sources of energization may be used, which can provide outputs of various polarities and magnitudes, to attain a "balanced bridge" effect. That is, only when there is no unbalance of magnitude or polarity of the sources of energization, will flow occur between the free ends.

7 Claims, 4 Drawing Figures

DUAL PIEZOELECTRIC FLUID JET TRANSFER VALVE

BACKGROUND OF THE INVENTION

This invention relates generally to jet transfer valves often used in fluidic systems and more particularly to a dual piezoelectric fluid jet transfer valve for easy and independent control of fluid flow.

Tyically, fluid jet transfer valves of the prior art have been of the mechanical type having a jet tube with a nozzle which is adjacent to two closely spaced ports aligned to selectively receive a jet stream of fluid from the nozzle when the nozzle is slightly deflected to different positions. The jet may be diverted or deflected as by outside means such as an airstream, movable orifice, the jet tube may be bent, or the jet may be disrupted to change the "free-air" flow stream into one or the other of the spaced ports. Further some jet transfer valves are controlled by merely interrupting the jet stream. Two types of mechanically bent jet tubes are known to the inventor, one being an electromagnet or solenoid attached to the tube for moving it from one port to the other. The other is a piezoelectric bender tube that may be bimorphic that is two piezoelectric U-shaped bars may be cemented together to form a tube, or a unitary tube may be formed that is polarized radially so as to bend in a plane. In summary, each of the prior art devices shows only one movable jet transfer valve with one control means that can be moved to impinge upon either of two ports.

SUMMARY OF THE INVENTION

The present invention relates to the use of a fluid jet transfer valve having two opposing and coaxially aligned piezoelectric bender tubes to transfer fluid over a small gap. The tubes may be bimorphic, that is, each tube may consist of two piezoelectric channel-shaped pieces cemented together, or they may be unitary and polarized radially, so as to bend in a single plane. When the tubes are in substantial alignment, due to being unenergized or energized to the same magnitude and polarity, transfer flow occurs, and obviously the deflection must be limited. When the tubes are out of alignment, due to one tube being energized and the other not, or energized to the different magnitude and/or polarity, fluid transfer will not occur from one tube free end to the other and will be lost to the environment.

OBJECTS OF THE INVENTION

Accordingly, an object of the present invention is to provide a new and improved fluid jet transfer valve.

Another object of the instant invention is to provide a dual controlled fluid jet transfer valve.

A further object of the present invention is to provide a fluid jet transfer valve utilizing piezoelectric bender tubes.

A still another object of the invention is to provide a jet transfer valve having redundancy in case of failure of operation one control element.

BRIEF DESCRIPTION OF THE DRAWINGS

A more complete understanding of the invention and many of the attendant advantages thereto will be readily appreciated as the same becomes better understood by reference to the following detailed description when considered in connection with the accompanying drawings wherein.

DESCRIPTION OF THE PREFERRED EMBODIMENT

Figure 1:
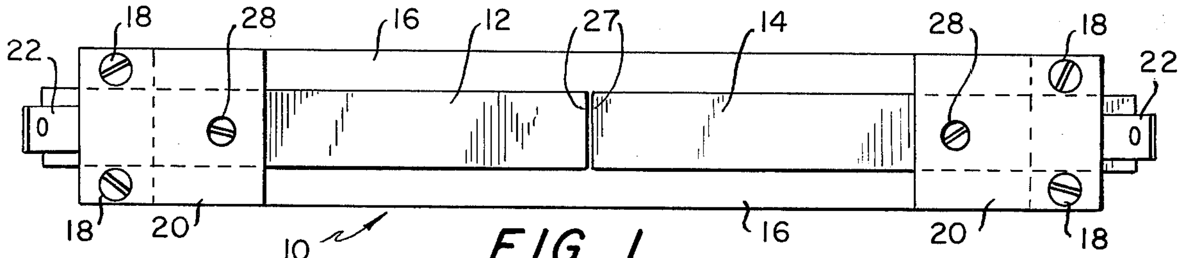
FIG. 1 is a top plan view of the dual piezoelectric bender tube fluid jet transfer valve.

Referring now to the drawing wherein like reference numerals refer to like parts throughout the several views, there is shown generally in the figures a dual bender tube piezoelectric fluid jet transfer valve 10, having opposing piezoelectric bender tubes 12 and 14. These tubes are mounted or clamped to a base 16 made of an electrical insulator material. The securing method for each bending tube 12, 14 is by using clamping screws 18, holding down a clamping block 20 made of an insulating material. The screws 18 then pass along side top electrical connectors 22 which are pressed against one side of the elements 12, 14. The screws then pass along side bottom electrical connectors 24 which are pressed against the other side of elements 12, 14. The screws are insulated from the connectors and tubes by mere spacing, and are thence threadably engaged in the base 16 to clamp down the whole assembly. Each of the tubes 12 and 14 are therefore clamped at their fluid connection ends 26 for free, unobstructed cantilever bending movement at their free inside ends 27, forming transfer jet that do not interfer upon relative movement. Further, each side of each tube has a conductive plating 13, and 15, respectively and is adapted for electrical connection by the connectors 22 and 24.

Referring now particularly to FIG's 2–4, showing a side view of the jet transfer valve elements in different positions, the clamps 20 are extended inwardly, and threadably engaged therein are top adjusting set screws 28 passing through to have there tip adjacent and capable of engaging the bender tubes 12, 14 to limit the upward bending thereof.

Coacting with the top adjusting screws 28, are bottom adjusting set screws 30 threadably engaged in base 16 from the bottom and recessed in their threaded holes. These bottom adjusting screws limit the downward bending of the tubes 12, 14.

A power source 34 providing a controlled electrical charge is electrically connected by two output leads 36 to the conductive platings 13 and 15 of the piezoelectric bender element 12 through the top and bottom electrical connectors 22 and 24 clamped thereto. Similarly, a power source 38 also providing an electrical charge is electrically connected by output leads 40 to the conductive platings 15 of the piezoelectric element 14 through its top and bottom electrical connectors 22 and 24.

In general, the operation of this dual piezoelectric fluid jet transfer valve is stated hereinafter. In this embodiment, each bender tube 12, 14 is a piece of piezoelectric material which can be bimorphic with two piezoelectric channels cemented together or preferably they are fabricated from a hollow piece formed of piezoelectric ceramic, or the like, that is polarized radially so as to be capable of bending only in one plane; in this case, up and down. It is to be understood, and it is shown, that each bender tube 12, 14 is connected to a separate power source 34 and 36, therefore each may be bent independent of the other. Conductive coatings along the tube cause transferal of the charge.

Figure 2:
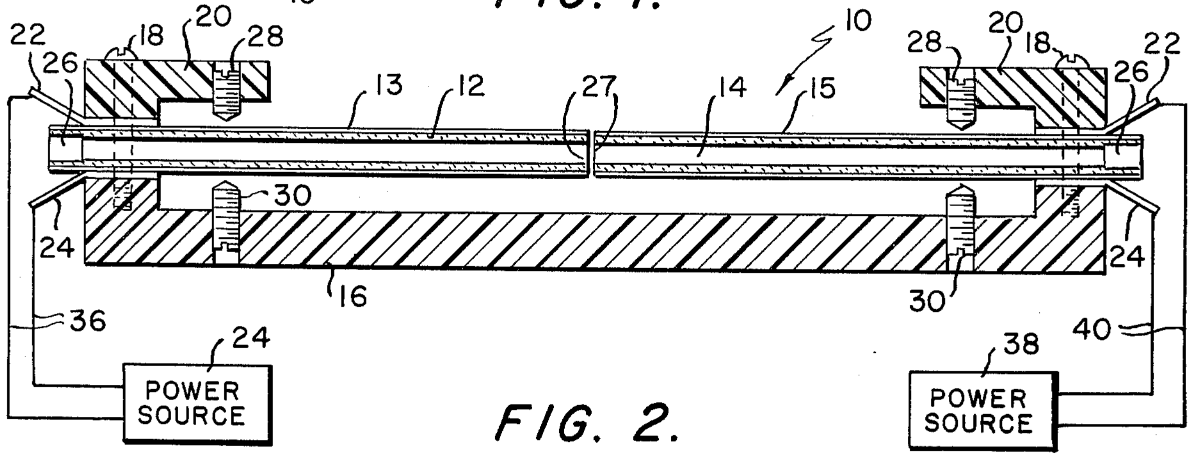
FIG. 2 is a side view in cross section showing the valve in an unenergized state for fluid transfer.
Figure 3:
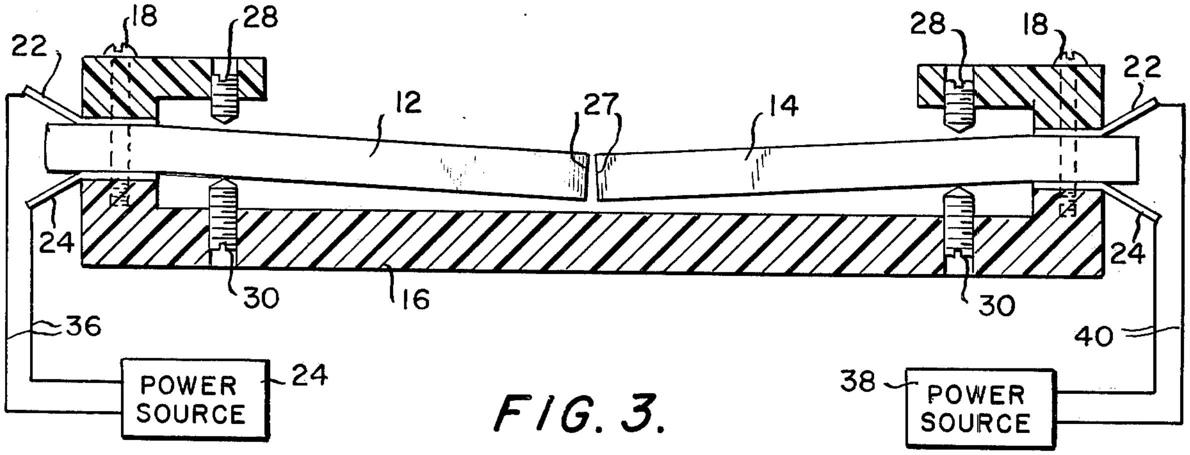
FIG. 3 is a side view showing the valve energized with each element bent equally for fluid transfer.
Figure 4:
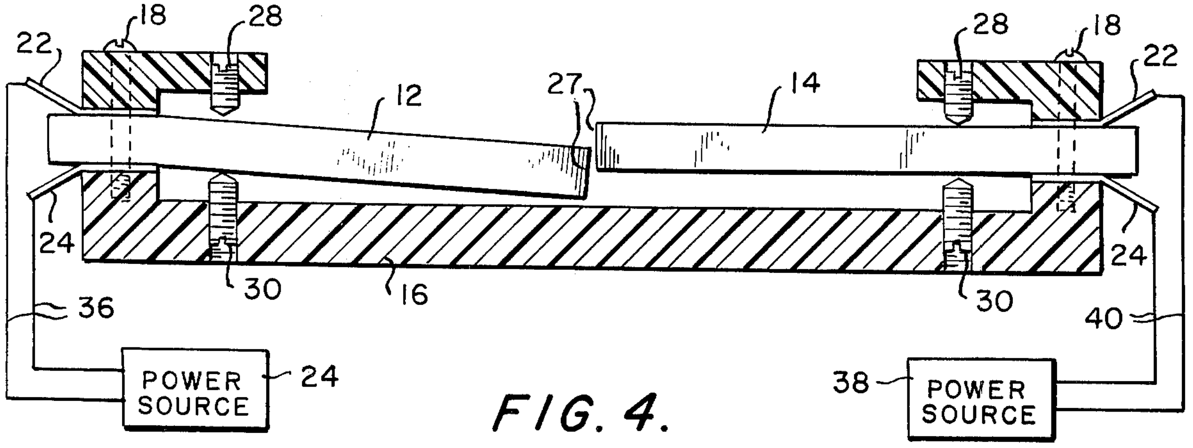
FIG. 4 is a side view showing the valve, energized with each element bent unequally or in different directions to interrupt fluid transfer.

Essentially there are two opposing and coaxially aligned fluid jets that can transfer fluid over a small gap at the free ends 27. When the bender tubes 12, 14 are not energized, or are energized through the electrical connectors 22 and 24 to the conductive coatings 13 and 15 to the same magnitude and polarity, the free ends 27 will be in substantial alignment, (FIG. 2 and FIG. 3) and fluid transfer will occur across the gap. When energized, deflection of the bender tubes 12, 14 is limited by the top and bottom adjusting screws 28 and 30, otherwise unlimited bending would discontinue flow. When one bender tube is energized and the other not, by the independent power sources, the free ends 27 of the tubes 12, 14 will be out of alignment (FIG. 4 for example) and fluid transfer will not occur across the gap and as shown, the fluid will be lost to the environment. Also when both tubes 12 and 14 are energized to a different magnitude and/or polarity, fluid transfer will not occur across the gap.

From the above described operation, the dual piezoelectric fluid jet transfer valve can be seen to have many applications, for example, it may be used in fluidic control circuits particularly where dual independent control is desired. Also, as can be readily seen, the bender tubes 12, 14 must not be energized, or else energized to the same magnitude and polarity for fluid transfer to occur. In other words, it simulates the operation of an electrical "balanced-bridge," that is, the power sources must be balanced to obtain an "output" or fluid transfer from one fluid jet tube to the other. The energy required for each bender tube 12 or 14 from its respective power source 34 and 36 also will be less than for a single bender tube, since if different polarities are used, each bender tube need only bend one-half its thickness or diameter to obtain discontinuity of flow across the gap.

Obviously, numerous modifications and variations of the present invention are possible in light of the above teachings. For example, the fluid transfer quantity could be varied by varying the adjustment of the adjusting screws or by varying the magnitude of the controlled electrical charge to the bender tubes. It is therefore to be understood that, within the scope of the appended claims, the invention may be practiced otherwise than as specifically described.

What is claimed is:

1. A dual piezoelectric fluid jet transfer valve comprising:

a pair of piezoelectric bender tubes each mounted at one end for cantilever action and the free ends coaxially opposing each other;

means for mounting said tubes at their outer, ends; and, means for applying controlled amounts of electrical charge independently to each of said bender tubes on selected faces to cause said free end to move in a plane;

whereby when the bender tubes are unenergized or energized to the same magnitude and polarity fluid transfer will occur, but when energized to a different magnitude and/or polarity, fluid transfer will not occur.

2. The jet transfer valve of claim 1 wherein said means for applying electrical charge further comprises:

a conductive plating on opposite faces of said bender tubes insulated from each other;

electrical connectors in contact with said platings and clamped by said means for mounting;

electrical leads connected to said electrical connectors; and a power source connected to said leads for providing said electrical charge independently to each of said bender tubes.

3. The jet transfer valve of claim 2 wherein said means for mounting said tubes comprises:

a base of insulating material under said bender tubes;

a clamping block over said bender tubes; and a plurality of threadable fasteners between said clamping block and said base for clamping said bender tubes therbetween.

4. The jet transfer valve of claim 3 wherein said bender tubes comprise:

a pair of channel-shaped pieces of a piezoelectric material cemented together at their adjoining edges to form a tube.

5. The jet transfer valve of claim 3 wherein said bender tubes comprise:

a unitary tube of piezoelectric material polarized radially so as to bend in a single plane.

6. The jet transfer valve of claim 5 further comprising:

a pair of deflection limiting screws, one threadably engaged in said clamping block and one into said base for contacting and thereby limiting the deflection of each bender tube in both the up and down direction.

7. The jet transfer valve of claim 6 wherein:

said free ends of said bender tubes are convex so as not to obstruct the relative movement therebetween when energized.

* * * * *